Sept. 20, 1960  G. I. HATFIELD  2,953,728
REMOTE POSITIONING POWER CONTROL
Filed March 19, 1958  3 Sheets-Sheet 1

INVENTOR.
GEORGE I. HATFIELD

BY Killman and Kerst
ATTORNEYS

Sept. 20, 1960  G. I. HATFIELD  2,953,728
REMOTE POSITIONING POWER CONTROL
Filed March 19, 1958  3 Sheets-Sheet 2

RE-ENTRANT SYSTEM

INVENTOR.
GEORGE I. HATFIELD

BY *Killman and Kerst*
ATTORNEYS

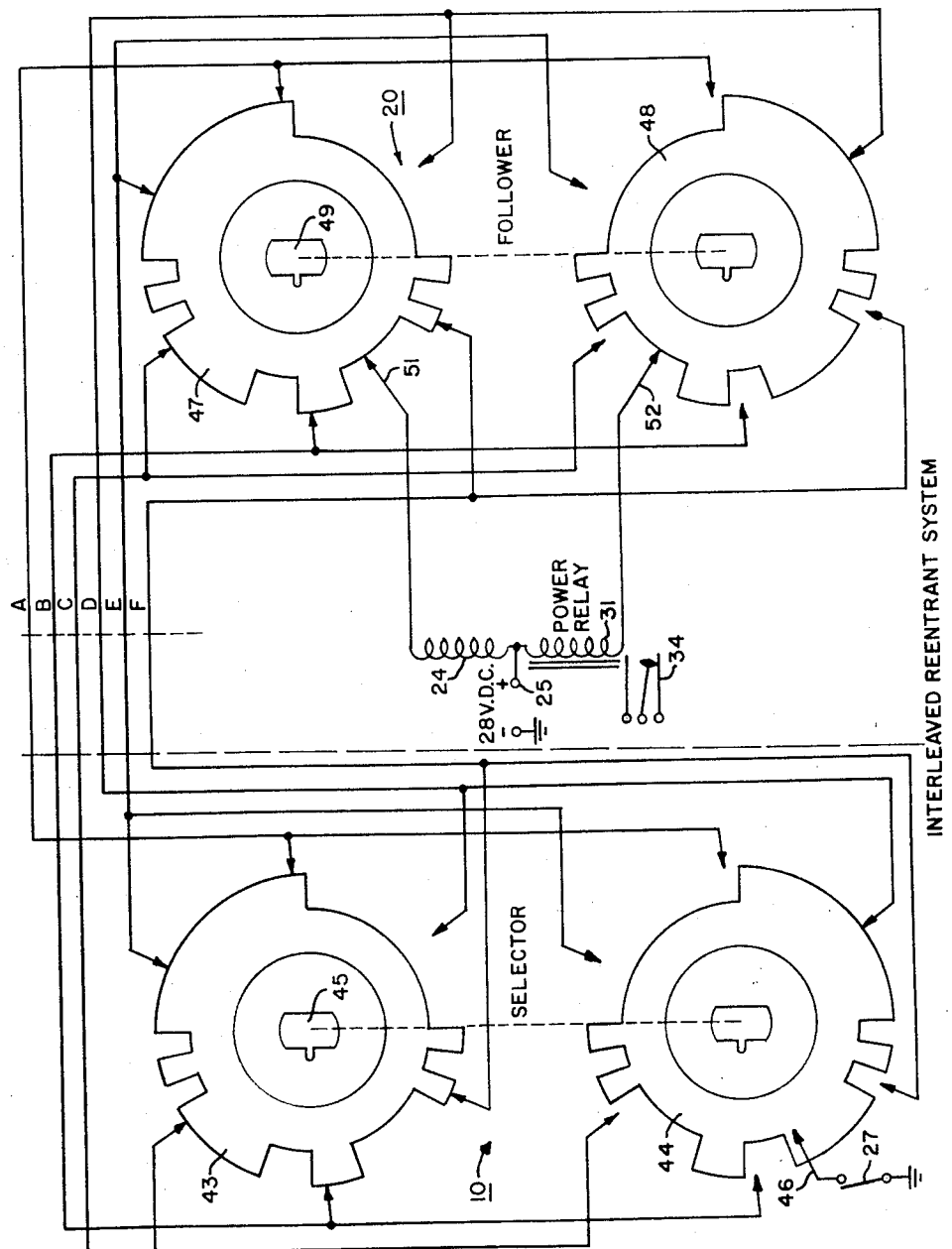

United States Patent Office

2,953,728
Patented Sept. 20, 1960

2,953,728

REMOTE POSITIONING POWER CONTROL

George I. Hatfield, Baltimore, Md., assignor to The Bendix Corporation, a corporation of Delaware Filed Mar. 19, 1958, Ser. No. 722,502

9 Claims. (Cl. 317—123)

This invention relates generally to follow-up systems wherein selective switch positions may be established at a selector control which is interconnected with a follow-up switch located at a remote position and which is arranged to establish an angular correspondence with the selected position of the selector switch. More particularly, this invention relates to the combination with such systems of power and signal control arrangements for performing control or signal functions upon the establishment of the selected position at the remote follow-up means.

Follow-up switch systems are well known in the prior art, one type generally comprising a selector switch having a plurality of switch positions to which are connected circuits which are energized in predetermined sequence upon actuation of the selector switch means in accordance with the pattern for switching established by the shape of a switching rotor. A connection provided between the selector switch means and the follow-up switch means includes a plurality of conductors which are interconnected between sending and receiving ends of the system in a manner to cooperate with the connections to the follow-up switch means to establish an identity between the position at which the follow-up means will come to rest and any selected position of the selector means. An early form of apparatus of this type merely comprises complementary rotor shapes at the sending and receiving ends of the system with a number of predetermined stator positions established around the periphery of the rotor contacts. For this simple open-seeking selector system of $n$ predetermined positions a similar number of $n$ conductors are required to interconnect the stator contacts establishing the positions. From this simple circuit the art has advanced to provide many arrangements whereby the number of available switch positions and hence angular shaft positions which can be obtained for a given number of control wires interconnecting the selector and the follow-up switch means has been greatly increased. An example of arrangements whereby a large plurality of switch positions can be obtained without employing unusually complex structure or circuit arrangements is shown in the patent to Hatfield No. 2,796,574 assigned to the assignee of the present invention. This prior patent clearly sets forth arrangements which are designated as re-entrant switching and interleaved re-entrant switching systems whereby a plurality of switch positions are provided without ambiguity and with a minimum number of interconnecting wires between the selector and follower switch locations.

In the various prior art systems of the general type providing for follow-up switch positioning it has often been required after the follow-up switch has achieved its position as determined by the selected position of the selector switch that further electrical control functions are required. In particular, some operation at the selector switch position may be required to communicate to the follower switch position signals or power control of apparatus at the follower position without disturbing the selected follower position once it has been established and under the control of an operator or apparatus at the selector position. The prior art arrangements for accomplishing this purpose have been unduly complex from the standpoint of equipment required and the number of interconnecting lines between the selector and power positions and have failed to provide the necessary flexibility in exercising the power control function.

It is the primary object of this invention to provide a switching system having both features to provide selective positioning and selective control of apparatus at the follower position.

It is a further object of this invention to provide for control switching in a multiposition switch follow-up system without regard to the number of positions in the follow-up system.

A further object of the invention is to provide a simple and economical arrangement whereby a control function can be exercised at the follower position without significantly increasing the cost of the switching system.

Another object of the invention is to provide for control switching between a selector station and a follower station which are interconnected by a plurality of control conductors without increasing the number of control conductors which are required for the combined operation over those necessary for the positioning operation alone.

These and other objects of the invention will become apparent from the following detailed description taken in conjunction with the accompanying drawings in which:

Fig. 4 is a schematic circuit diagram of the invention as embodied in an interleaved re-entrant system.

In accordance with a preferred embodiment of the present invention a pair of corresponding switching elements present in a follow-up system are used, one located at the selector position and the other located at the follower position, and a circuit is established by continuous connection to these rotating elements. This circuit is completed when the follower switch means has come to rest at the position established by the rotation of the selector switch means and the circuit further includes auxiliary selective switch means at the selector station and signal or power responsive means at the follower station whereby the auxiliary switch means at the selector station may be used to control the power or signal means at the follower station upon the follower attaining its rest position determined by the selector.

Figure 1:
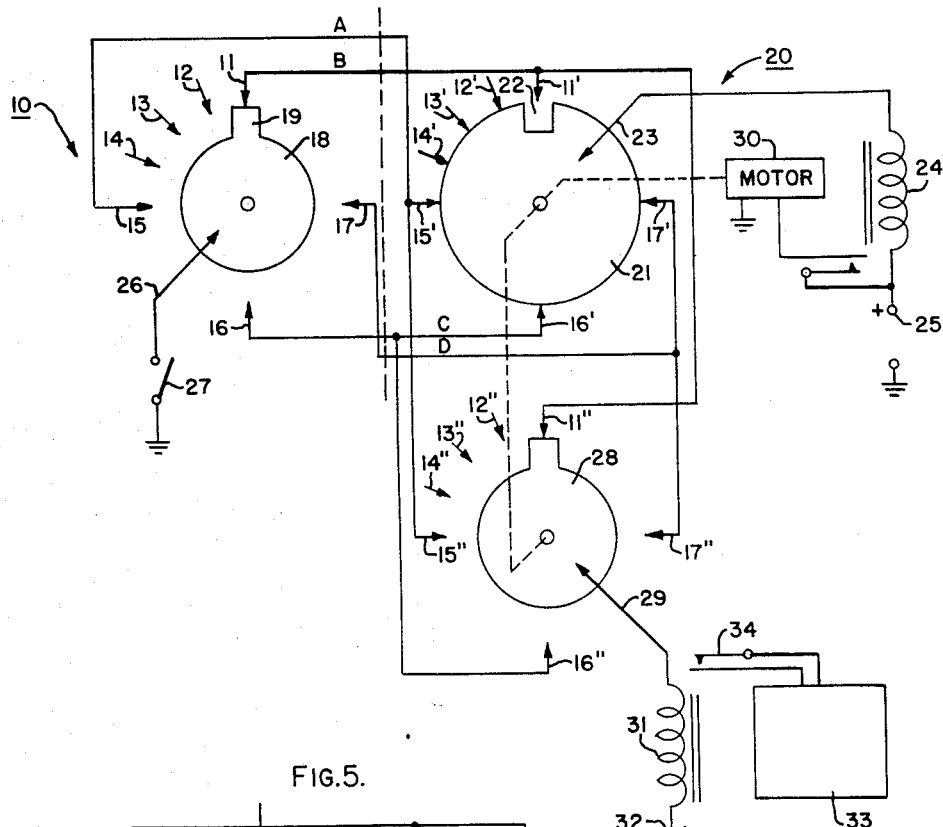
Fig. 1 is a schematic circuit diagram of a simple switching system embodying the invention.

Referring now more particularly to the drawing as shown in Fig. 1, a simple $n$ wire open-seeking switch positioning means comprises a selector station generally designated 10 and a follower station generally designated 20. Throughout this specification the selector station 10 will be considered as the controlling station which is rotated to select the rotative position desired and such controlling stations are indicated as being remote from the follower station 20 by being to the left of the vertical dashed line shown in the figures. To the right of the dashed line the follower station 20 will be considered the controlled element which follows the position established by the controlling station 10.

The follow-up portion of the system shown in Fig. 1 is well known in the art and provides for $n$ shaft positions corresponding to $n$ stator switch positions 11, 12, 13, 14, 15, 16, 17 peripherally arranged around a rotor element 18. The rotor 18 has a protruding tooth 19 which makes contact with the stator contacts 11–17 at the individual positions at which they are located. At the follower position 20 is a switch having a rotor 21 which is the complement of rotor 18, i.e., provides a cut-out portion 22 at a position corresponding to the tooth 19 of rotor 18 and vice versa. Arranged around the periphery of rotor 21 are contacts 11′, 12′, 13′, 14′, 15′, 16′, 17′ corresponding in position to the respective unprimed numbered contacts at the selector position 10 and directly connected thereto by the control conductors A, B, C, D.

The rotor 21 is continuously contacted by a long brush 23 irrespective of positional rotation of the rotor 21. The brush 23 is connected to motive power control means 24 which may be a stepping relay arrangement adapted to be energized from a power source 25 or a conventional relay to actuate an electric motor 30. The energization circuit for the relay 24 proceeds from the source 25 through the brush 23 to rotor 21 over one of the connecting control conductors A, B, C, D to stator contact 11, which is in contact with the tooth 19 of rotor 18. The rotor 18 is contacted continuously by long brush 26 which completes the circuit to ground through a switch 27 which may be normally closed. With switch 27 closed the operation of the circuit described up to this point is conventional in accordance with the teachings of the prior art.

The present invention provides for local control of a remote device in the system of Fig. 1 by providing in the lead grounding brush 26 on the selector rotor 18 a selectively operable switch 27. At the controlled follower position 20 a rotor 28 similar in shape to the rotor 18 is mounted for rotation with the rotor 21. The rotor 28 operates with respect to a set of peripheral contacts 11″, 12″, 13″, 14″, 15″, 16″, 17″ which are respectively connected to the correspondingly numbered contacts for the rotors 21 and 18. A long brush 29 continuously contacts the rotor 28 and is connected to a control relay 31 which is energized from a power source 32. The relay 31 may be arranged to control any suitable utilization device 33 by means of contacts 34 actuated by the relay 31.

In the operation of the system of Fig. 1 it will be appreciated that the remote positioning system is illustrated as a specific n wire system with n contacts for each rotor one corresponding to each control lead, A, B, C, D with as many more control leads added as is necessary to supply the required number of rotational positions for the selector and follower rotors. For the additional shaft rotational positions, leads 12, 13 and 14 associated with rotor 18 would be connected by individual control leads, not shown, to the correspondingly primed contacts on the rotor 21 and the rotor 28 at the controlled position. For the four wire system shown in complete form in Fig. 1 the operation of the system to position rotor 21 in accordance with the selected position of rotor 18 will be obvious to those familiar to the prior art. For the positions of the rotor shown in Fig. 1 it will be seen that the contact 11′ opposite the cut-out portion 22 of the rotor 21 opens the only circuit by which the motor 24 is energized with the rotor 18 in the position shown making contact with the contact 11. Upon the rotors attaining any selected position, such as at contact 11, the rotor 28 completes a circuit from the rotor 18, contact 11, contact 11″, and relay 31 from the power source 32 which energizes the relay 31. With this circuit completed the selective control of the energization of the relay 31 is available at the selector position 10 by means of switch 27 which can be opened and closed to alternately energize or deenergize the relay 31 and hence provide the desired control to the utilization device 33 through the contacts of the relay 34. This control is achieved without the addition of auxiliary leads between the selector and follower positions and without altering in any fashion the operation of the follow-up switching system.

Figure 2:
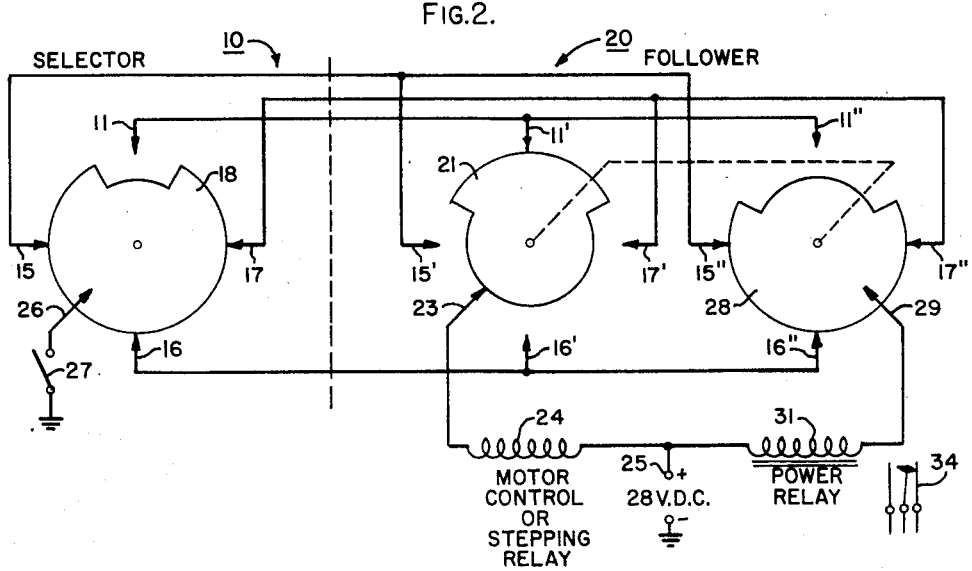
Fig. 2 is a schematic circuit diagram of the invention as embodied in a somewhat different switching system.

Referring now to Fig. 2 a four wire open-seeking follow-up switching system is shown which is generally similar to the system of Fig. 1 except that the rotor elements are the complements of the corresponding rotors in the Fig. 1 system. Accordingly, parts which functionally correspond to Fig. 1 are numbered the same in Fig. 2. The elements added for the purposes of incorporating the present invention into the follow-up system are likewise numbered the same as corresponding elements in the Fig. 1 system and it will be seen that the only addition to the follow-up system required for the purposes of the invention are that the rotor 28 in Fig. 2 is added and has substantially the same contour as the rotor 18 of Fig. 2. In practicing the invention with a straightforward n wire n position system therefor the addition of a rotor at the follower position 20 corresponding to the rotor at the selector position 10 represents substantially the entire increased cost of providing the system with the advantages of the invention.

Figure 3:
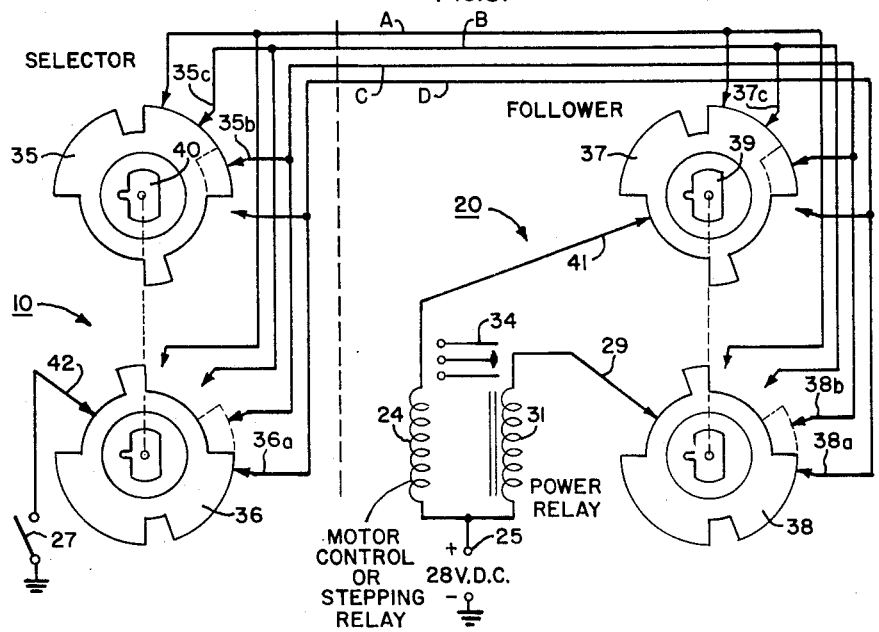
Fig. 3 is a schematic circuit diagram of the invention as embodied in a re-entrant switching system.

Referring now to Fig. 3 there is shown a re-entrant positioning system of the type discussed in some detail in the aforementioned patent to Hatfield. Re-entrant systems generally comprise, as does the system of Fig. 3, a pair of rotors at the selector station comprising a front disc 35 and back disc 36 which are keyed for rotation on a shaft 40 by means of an insulating mounting washer all of which is well known in the art, particularly in the type of switch known as a wafer switch. At the follower position 20 an identical pair of rotors is provided comprising a front rotor 37 and a rear rotor 38 mounted for rotation on a common shaft 39 which is to be positioned in accordance with the position of the selector shaft 40. As is well known in the re-entrant type switching art, any lack of correspondence between the position of follow-up rotors 37 and 38 and the selector rotors 35 and 36 will result in energization of the motor control 24 from the power source 25 through a long wiping contact 41 on the rotor 37 and contacts to one or more of the other rotors to rotor 36 where a long wiping contact 42 making continuous contact with the rotor 36 completes the circuit through normally closed switch 27 to ground.

As an example of the re-entrant path involving all rotors to complete the connection to the motor control relay 24 consider the system at rest rotated one switch position counterclockwise at both the selector and follower positions 10, 20. The significant changes in the switch connections for this assumed position are indicated by the dotted portion of the rotors 35, 36, 37, 38. Now assume that the selector 10 is rotated one switch position clockwise which is the position illustrated in full lines in Fig. 3. Now the circuit from brush 42 will be by way of rotor 36, contact 36a, conductor D, contact 38a, rotor 38, contact 38b, conductor C, contact 35b, rotor 35, contact 35c, conductor B, contact 37c, rotor 37, and brush 41 to the relay 24. This is the re-entrant type of path. As is also well known, the attainment by the motor control means 24 of a position of correspondence between the selector and the follower rotors results in an interruption of the circuit to ground which had been completed through the wiping contact 42. The shaft 39 thus stops at a position determined by the selective rotation of the shaft 40 and the follow-up action, in accordance with the teaching of the prior art, is achieved.

The present invention may be utilized in a re-entrant follow-up switching system, of which Fig. 3 is a representative example, by the addition to the already existing rotor 38 of a long wiping contact 29 making continuous contact with the rotor 38. Connected to the brush 29 is the power or control relay 31 which is connected to the power source 25. Upon the follower 20 reaching its preselected position of correspondence with the selector 10 the switch 27 connected to the brush 42 is available at the selector position 10 for control of the energization of the relay 31 and consequent control of any device which may be connected to the contacts 34 thereof.

The present invention may be incorporated in re-entrant systems of any particular type as will be apparent from the disclosure with relation to Fig. 3. The normally grounded rotor 36 which is grounded through the continuous connection of brush 42 is readily adapted to the invention by the provision of a switch 27 in the grounding lead which may be normally closed for follow-up operation. The identically shaped rotor 38 in the follower position 20 has added thereto the continuous wiping contact 29 in addition to the structure required for the positioning system. With this simple arrangement the control operation of relay 31 or similar apparatus is achieved without the addition of additional interconnecting control conductors between the selector and follower positions 10, 20 and with substantially no increase in the cost of the apparatus.

Referring now to Fig. 4 there is shown a re-entrant interleaved follow-up switching system of the type disclosed and claimed in detail in the aforementioned patent. The construction and operation of the system of Fig. 4 will be apparent from the teaching of the aforementioned patent and the details of the follow-up positioning system will not be repeated herein but are incorporated by reference from the patent. The general arrangement of an interleaved re-entrant system comprises a front rotor 43 and a back rotor 44, which are generally mounted to a common shaft 45 which is selectively positionable in accordance with the desired control operation at the controlling station 10. The contour of the rotors 43 and 44 and the positioning of peripherally spaced stator contacts are made in accordance with the desired sequence of switching connections all as taught in the aforementioned patent. The rotor 44 is provided with a continuously wiping contact 46 to provide a ground connection through a switch 27 which may be normally closed. At the follower position 20 an identical set of rotors is provided comprising a front rotor 47 and a rear rotor 48 preferably mounted on a common shaft 49. A set of peripheral contacts is arranged around the edge of the rotors 47, 48 as provided for the selector rotors 43, 44 and suitable interconnecting control conductors A, B, C, D, E, F are connected between the corresponding contacts for each rotor. To rotor 47 is connected a continuous wiping contact 51 for energizing the motor control means 24 for rotating shaft 49 in accordance with the teaching of the aforesaid Hatfield patent. To rotor 48 which is identical in shape with the selector rotor 44 is connected a continuous wiping contact 52 which is connected to a power or control relay 31 for the operation of controlled apparatus such as through contacts 34 associated therewith.

With the arrangement of Fig. 4 selective positioning of the shaft 49 may be obtained by turning the shaft 45 to the desired position which effects energization of the motor control 24 to turn the shaft 49 as long as correspondence between the two shaft positions does not obtain. The energization circuit for the motor 24 proceeds from the power source 25 through the relay 24, brush 51, two or more of the rotor elements to the brush 46 through closed switch 27 to ground. Once a correspondence has been obtained between the rotational positions of shaft 45 and 49 the control of relay 31 is selectively available through the opening or closing of switch 27. Accordingly, for interleaved re-entrant switching systems the invention may achieve selective control at a remote position without the addition of extra interconnecting wires between the selector and follower positions 10, 20 by means of the simple addition of a switch 27 at the selector position 10 and a brush contact 52 at the follower position with appropriate wiring therefrom to the device to be controlled.

Figure 5:
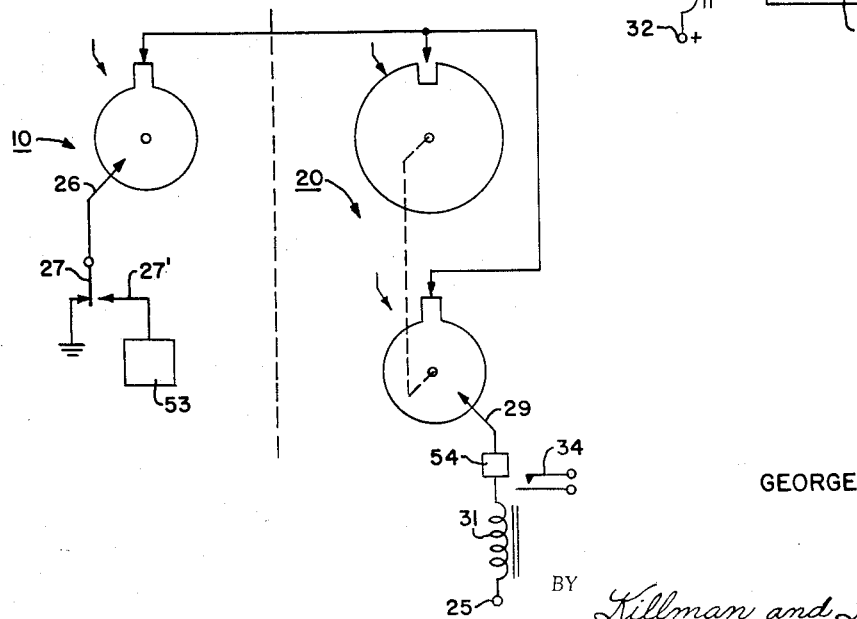
Fig. 5 is a fragmentary schematic circuit diagram showing an alternative construction of the invention which is applicable to any of the systems of the invention.

The modification of Fig. 5 is shown in fragmentary form to illustrate a feature providing selective control which may be useful under certain conditions. The modification is disclosed with respect to elements of a system similar to that of Fig. 1 although it will be readily apparent to those skilled in the art that the modification can be applied equally well to any of the disclosed systems or any follow-up systems to which the invention may apply generally. In the system of Fig. 5 switch 27 is provided as before and is shown normally closed to a ground circuit. An alternative contact 27' is provided connected to a device 53 which may be a tone generator, a coded signal generator, or any suitable device for selectively energizing appropriately responsive mechanism. In conjunction with the device 53 the brush 29 at the follower position is connected to a device 54 which may be a filter responsive to the tone generated by device 53 or may be a code responsive device operable only by the code generated by the device 53 or other suitable mechanism such that the relay 31 is energized only upon receipt of signals from the device 53. If the device 54 acts as a switch, the relay 31 may be energized from the power source 25 as before or alternatively, the relay 31 may be solely energized from the device 54 or energy from device 53 passed therethrough. In either event it will be apparent that the contacts 34 of the relay 31 are now under control of the operator of switch 27 and will not be energized until switch 27 is moved to contact 27' for connecting the coded source 53 with the code responsive device 54 through the switch connections 26 and 29. The operation of the follow-up switching device is achieved as heretofore described. Upon the completion of the follow-up rotation at the position 20, however, the relay 31 is not immediately energized due to the selective character of the device 54 which will respond only to signals from the device 53 upon the actuation of the switch 27 to the contact 27'. Accordingly, the remote actuation of relay 31 and contacts 34 are completely under the control of the operator manipulating switch 27.

Many arrangements will now be apparent to those skilled in the art whereby the teachings of the present invention may be incorporated in a large number of prior art follow-up switching systems to obtain the selective control at a remote location provided by the invention. In addition to the obvious applicability of the invention to various switching systems other changes will be apparent such as the interchanging of power supplies and connections thereto as well as the employment of equivalent apparatus for the various control and switching functions. Accordingly, the invention is to be considered as having been described with respect to a specific embodiments but to be limited only by the scope of the appended claims.

I claim:

1. In an automatic switching arrangement, the combination comprising a selector switch and a follow-up switch each having a set of contacts interconnected by a plurality of conductors, means for engaging permutations of said selector switch contacts, motive power means energized through both of said switches for engaging permutations of said follow-up switch contacts in sequence except for corresponding permutations at both said switches, a control circuit completed through both said switches and one of said conductors for said corresponding permutations, selective control means connected in said control circuit at said selector switch and utilization means responsive to said control means connected to said control circuit at said follow-up switch.

2. In an automatic shaft-positioning system having a selector switch unit and a follow-up switch unit each of said units having a set of stationary contacts and movable contacts with said stationary contact sets interconnected respectively by a plurality of conductors and rotor means for each unit for operating the respective movable contacts into engagement permutations with said stationary contacts, motive power means, and means in circuit with said contacts and said conductors for energizing said motive power means for rotating said rotor of said follow-up unit and said shaft until the setting of said follow-up rotor corresponds to the setting of said selector switch rotor, a control circuit comprising control signal means connected to said selector unit, control signal responsive means connected to said follow-up unit, and a circuit connecting said signal means and said responsive means through said sets of stationary contacts said movable contacts and said conductors for corresponding settings of said rotors.

3. Apparatus according to claim 2 in which said control signal means generates a characteristic signal distinct from the other electrical energy in the system and said responsive means responds only to said characteristic signal.

4. An *n*-positive open-seeking follow-up switching system comprising a selector switch having a single rotor contact movable with respect to *n* stationary contacts, an open-seeking switch having a rotor movable with respect to *n* stationary contacts and contacting all but one of said last named contacts for any rotative position thereof, *n* conductors respectively interconnecting said stationary contacts of said selector switch and said seeker switch, a third switch having a single rotor contact coupled to rotate with said seeking switch rotor and with respect to *n* stationary contacts connected respectively to said conductors, individual brush contacts continuously contacting each of said rotors, a motor for rotating said coupled rotors, a motor control means for said motor connected to a source of power and to said brush contacts on said selector switch rotor and said seeker switch rotor, an electroresponsive means conencted from said source of power to said brush contact on said third switch, and switch means for selectively opening the connection of said source to said brush contact on said selector switch rotor.

5. A follow-up switching system comprising a selector rotor of predetermined contour rotatable with respect to a plurality of peripherially spaced fixed contacts, a seeking rotor of complementary contour to said predetermined contour and rotatable with respect to a similarly spaced set of fixed contacts, a third rotor having substantially said predetermined contour and coupled to rotate with said seeking rotor with respect to a similarly spaced set of fixed contacts, a plurality of conductors interconnecting the respective fixed contacts of said sets, individual brush contacts continuously contacting each of said rotors, a motor for rotating said coupled rotors, a motor control circuit for energizing said motor including a path from said brush on said seeking rotor to said brush on said selector rotor, an electroresponsive device energized from a connection with said brush on said third rotor, and switch means for selectively opening the circuit connected to said brush on said selector rotor for controlling said device.

6. Apparatus for positioning a shaft in any one of a number of positions comprising a re-entrant switching system having a pair of complementary selector rotors rotatable as a selector means, a like pair of complementary follower rotors rotatable with said shaft, a set of stator contacts for each said rotor, a plurality of conductors connecting the respective stator contacts of each said set, individual brushes continuously contacting a first one of said selector rotors and both of said follower rotors, motive power means for rotating said shaft, a circuit connected to said selector rotor brush and said brush on the follower rotor complementary to said first selector rotor for energizing said motive power means until the position of said follower rotors corresponds to the position of said selector rotors, an electroresponsive device connected to said brush on the other said follower rotor and switch means for selectively opening the circuit connected to said brush on said selector rotor for controlling said device.

7. Apparatus for positioning a shaft in any one of a number of positions comprising an interleaved re-entrant switching system having a pair of complementary selector rotors rotatable as a selector means to correspond with each of said positions, a like pair of complementary follower rotors rotatable with said shaft to each of said positions, a set of stator contacts for each said rotor peripherally spaced around said rotors by angular increments which are integral multiples of the angular spacing between said positions, individual brushes continuously contacting a first one of said selector rotors and both of said follower rotors, motive power means for rotating said shaft, a circuit connected to said selector rotor brush and said brush on the follower rotor complementary to said first selector rotor for energizing said motive power means until the position of said follower rotors corresponds to the position of said selector rotors, an electroresponsive device connected to said brush on the other said follower rotor and switch means for selectively opening the circuit connected to said brush on said selector rotor for controlling said device.

8. In a switching follow-up system having multiposition rotary switch units at a selector station and a follower station with like stator contacts interconnected, a contoured rotor at said selector station and a pair of complementally contoured rotors at said follower station one of which is the same contour as said selector station rotor with means for rotating said follower station rotors until the position of said follower rotors corresponds to any selected position of said selector rotor, the improvement comprising signaling means at said selector station, signal responsive means at said follower station and a circuit between said signaling means and said responsive means by way of said selector rotor, said interconnected contacts and said same contour follower station rotor.

9. Apparatus according to claim 8 in which said signaling means generates a characteristic signal distinct from the other electrical energy in the system and said responsive means responds only to said characteristic signal.

References Cited in the file of this patent

UNITED STATES PATENTS 2,814,013    Schweighofer       Nov. 19, 1957